Feb. 25, 1936.   R. F. KOHR   2,031,717
BRAKE
Filed March 7, 1932
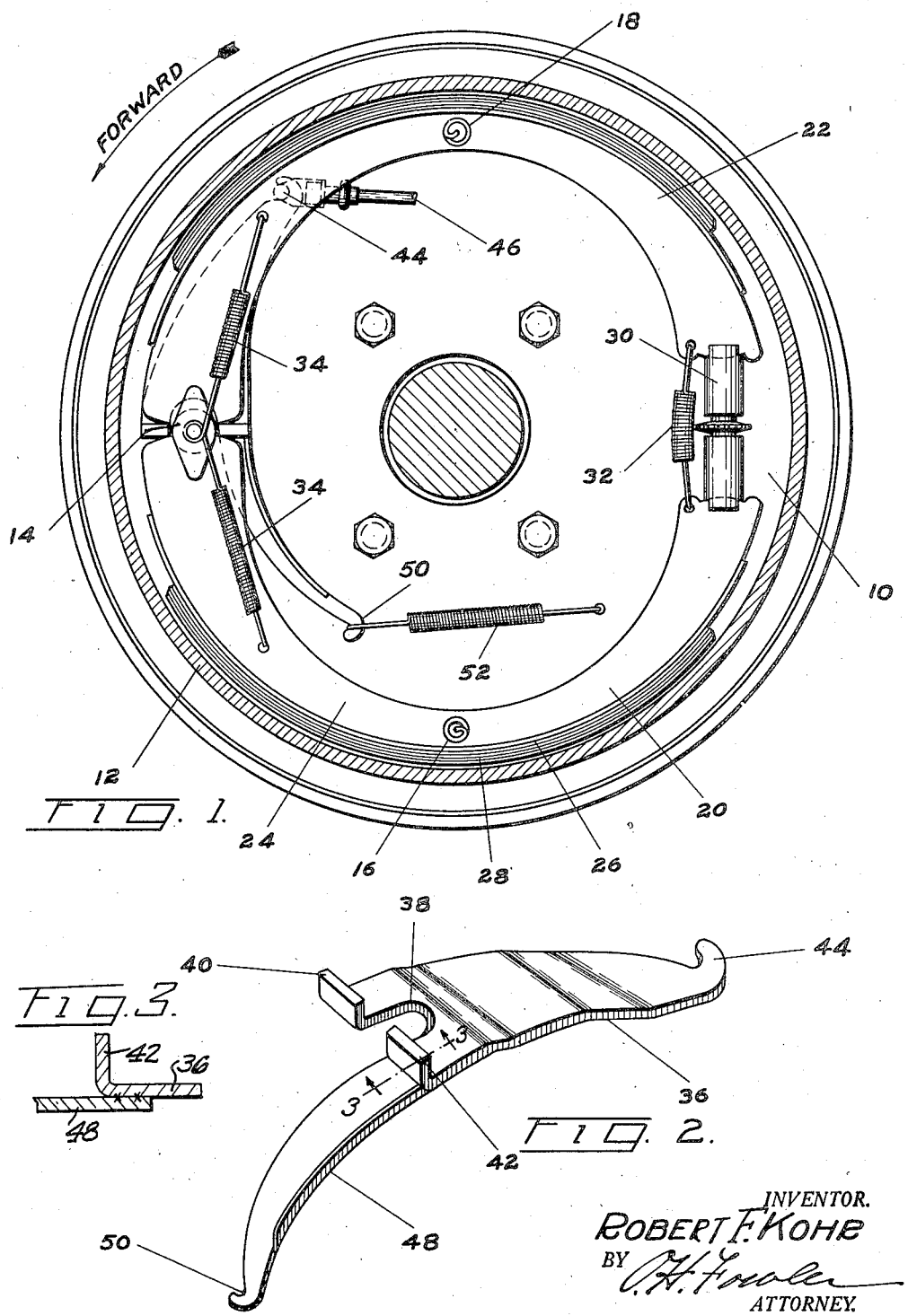

Patented Feb. 25, 1936

2,031,717

UNITED STATES PATENT OFFICE 2,031,717

BRAKE

Robert F. Kohr, South Bend, Ind., assignor to Bendix Aviation Corporation, South Bend, Ind., a corporation of Delaware Application March 7, 1932, Serial No. 597,381

9 Claims. (Cl. 188—78)

This invention relates to brakes and more particularly to internal expanding brakes.

Broadly, the invention comprehends brake structure, including a fixed support, a rotatable drum associated therewith and a friction element on the support for cooperation with the drum, and means for spreading the friction element into drum engagement including a floating operating lever having a part extending beyond the fulcrum of the lever to which is connected a spring for returning the lever to its normal position.

The structure of the floating operating lever is designed to maintain the spring load at the fulcrum of the lever. This serves to eliminate an anti-rattler. The structure also makes possible a much lower spring rate for cable travel than has heretofore been possible, due to the mechanical limitations.

An object of the invention is to provide an easier pedal movement.

Another object of the invention is to provide an operating lever for the friction element of an internal expanding brake, including means for taking up the clearance between the lever and drag or operating cable connected thereto.

Another object of the invention is to provide a floating operating lever for the friction element of an internal expanding brake, including means for maintaining the load of the return spring of the lever at the fulcrum of the lever and thus eliminating rattling of the lever and of parts formerly used for this purpose.

A feature of the invention is a floating operating lever, having an arm extending beyond the fulcrum of the lever.

Other objects and features of the invention, including various details of structure will be apparent from the following description taken in connection with the drawing, which forms part of this specification, and in which:

Figure 1 is a vertical sectional view of a brake taken just back of the head of the drum, illustrating the friction elements in side elevation and showing the invention as applied;

Figure 2 is a prospective view of the operating lever; and

Figure 3 is a partial section on the line 3—3 of Figure 2.

Referring to the drawing for more specific details of the invention, 10 represents a fixed support such as a backing plate. The backing plate has associated therewith a rotatable drum 12, which may be secured to a wheel, not shown. The backing plate has positioned thereon, an anchor 14, and suitable steady rests 16 and 18, and positioned for movement on the steady rests 16 and 18 are friction elements or shoes 20 and 22.

The shoes are of the conventional type, each including a web 24, supporting a rim 26, to which is suitably secured a friction lining 28, adaptable for cooperation with the drum. The articulative ends of the shoes are connected by a suitable adjusting member 30 and a spring 32. The separable ends of the shoes embrace the anchor 14, and are each connected to the anchor by suitable return springs 34. These springs 34 serve to return the shoes to the off position, and to retain them in this position in proper space relation to the drum.

Positioned between the separable ends of the shoes 20 and 22 on the anchor 14 is a floating operating lever 36. The lever 36 is slotted as indicated 38, to straddle the anchor 14 and is provided adjacent the slotted portion with cams 40 and 42 extending between the separable ends of the friction elements or shoes 20 and 22.

As shown the floating operating lever is positioned on the backing plate beneath the shoe 22 and the force applying end of the lever has a hook 44, to which is connected a drag or operating cable 46, leading to an operating means, not shown. Formed integral with the lever 36 is an arm 48 terminating in a hook 50, to which is connected one end of a spring 52, having its other end suitably connected to the backing plate.

The spring 52 returns the cable 46, and takes up the clearance to prevent rattling of the connection between the lever 36 and the cable; and in addition thereto, the load of the spring is imposed on the fulcrum of the lever. This also serves as an anti-rattler between the lever and the anchor on which it is fulcrumed. It further precludes the use of springs, washers, and other devices formerly employed for this purpose, and makes possible a much lower spring rate for cable travel than has been found possible in structures heretofore employed.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention what I claim as new and desire to secure by Letters Patent, is:

1. A brake comprising an operating member including a lever having a longitudinal slot, lateral cams on the lever, and an arm extending beyond the fulcrum of the lever.

2. A brake comprising an operating member in one rigid structure including a floating lever, cams, said lever having an elongated opening adjacent said cams adapted to receive a brake anchor and to permit the cams to shift relatively to an anchor therein integrally formed thereon and an arm rigid therewith and extending beyond the cams.

3. A brake comprising an operating lever having a cam formed on one end thereof, and formed with an elongated slot adjacent said cam, a hook on the other end, and an arm extending beyond the end having the cam.

4. A brake comprising an operating lever having a bifurcated end and flanges providing a cam, a hook on the other end of the lever, and an arm extending from the bifurcated end of the lever.

5. A brake comprising an operating lever having a slot in one end, a hook on the other end, cams adjacent the slot, and an arm extending from the slotted end.

6. A brake comprising an operating lever including an arcuate member, hooks on the respective ends of the member, and cams arranged centrally of and rigid with the member, said member being formed with an elongated opening between said cams.

7. A brake comprising an operating lever including an arcuate member slotted centrally, cams adjacent the slot, and hooks on the respective ends of the member.

8. A brake comprising a fixed support, an anchor on the support, a rotatable drum associated with the support, friction elements on the support for cooperation with the drum, a floating operating lever fulcrumed on the anchor between the separable ends of the friction elements, an arm on the operating lever extending beyond the fulcrum of the lever, and a spring connecting the arm to the fixed support.

9. A brake comprising a fixed support, an anchor on the support, a rotatable drum associated with the support, friction elements on the support adaptable for cooperation with the drum, means for moving the friction elements into drum engagement including a floating operating lever fulcrumed on the anchor having parts positioned between the separable ends of the friction elements, an operating cable connected to the lever, an arm extending beyond the fulcrum of the lever, and a return spring connecting the arm to the support.

ROBERT F. KOHR.

CERTIFICATE OF CORRECTION.

Patent No. 2,031,717.                                    February 25, 1936.

ROBERT F. KOHR.

It is hereby certified that error appears in the printed specification of the above numbered patent requiring correction as follows: Page 2, first column, lines 9, 10 and 11, claim 2, strike out the words "integrally formed thereon and an arm rigid therewith and extending beyond the cams" and insert the same after "cams" and before the comma in line 6, same claim; and that the said Letters Patent should be read with this correction therein that the same may conform to the record of the case in the Patent Office.

Signed and sealed this 29th day of September, A. D. 1936.

Henry Van Arsdale (Seal)                                          Acting Commissioner of Patents,